United States Patent [19]

Kimura

[11] Patent Number: 4,484,234

[45] Date of Patent: Nov. 20, 1984

[54] VIDEO TAPE RECORDING AND REPRODUCING APPARATUS

[75] Inventor: Kenji Kimura, Hachioji, Japan

[73] Assignee: Olympus Optical Co., Ltd., Tokyo, Japan

[21] Appl. No.: 358,577

[22] Filed: Mar. 16, 1982

Related U.S. Application Data

[63] Continuation of Ser. No. 122,180, Feb. 19, 1980, abandoned.

[30] Foreign Application Priority Data

Feb. 20, 1979 [JP] Japan .................................. 54-18741

[51] Int. Cl.³ ............................................. H04N 5/92
[52] U.S. Cl. .................................... 358/340; 358/335; 360/22; 360/33.1
[58] Field of Search ............... 358/340, 328, 335, 167, 358/166; 360/22, 23, 9.1, 30, 7, 124, 33.1, 26; 369/60; 455/303–306

[56] References Cited

U.S. PATENT DOCUMENTS 2,986,608  5/1961  Pettus ................................... 360/124
3,893,168  7/1975  Bechly ................................. 360/33.1
3,975,764  8/1976  Kobayashi ............................ 360/9.1
4,048,658  9/1977  Nakagawa ............................ 360/9.1
4,218,713  8/1980  Horah .................................. 360/22

Primary Examiner—Alan Faber
Attorney, Agent, or Firm—Toren, McGeady and Stanger

[57] ABSTRACT

The disclosed video-tape recording and reproducing apparatus, includes a system to transform the field signal into multi-channel signals; a number of modulators to produce modulated carrier waves, modulated by each of the multi-channel signals; a system to provide a fixed time delay to the modulated carrier waves, and also to mix the delayed carrier wave into the modulated carrier waves of neighboring channels as a cancellation signal for cross talk current; and a multi-channel head for recording and reproducing the output of the mixing system, to achieve elimination of cross talk current caused by interference between heads during recording. The delaying system includes delay lines to delay the modulated carrier waves a fixed time, and mixers to mix the delayed carrier waves with other channels' modulated carrier waves.

4 Claims, 3 Drawing Figures

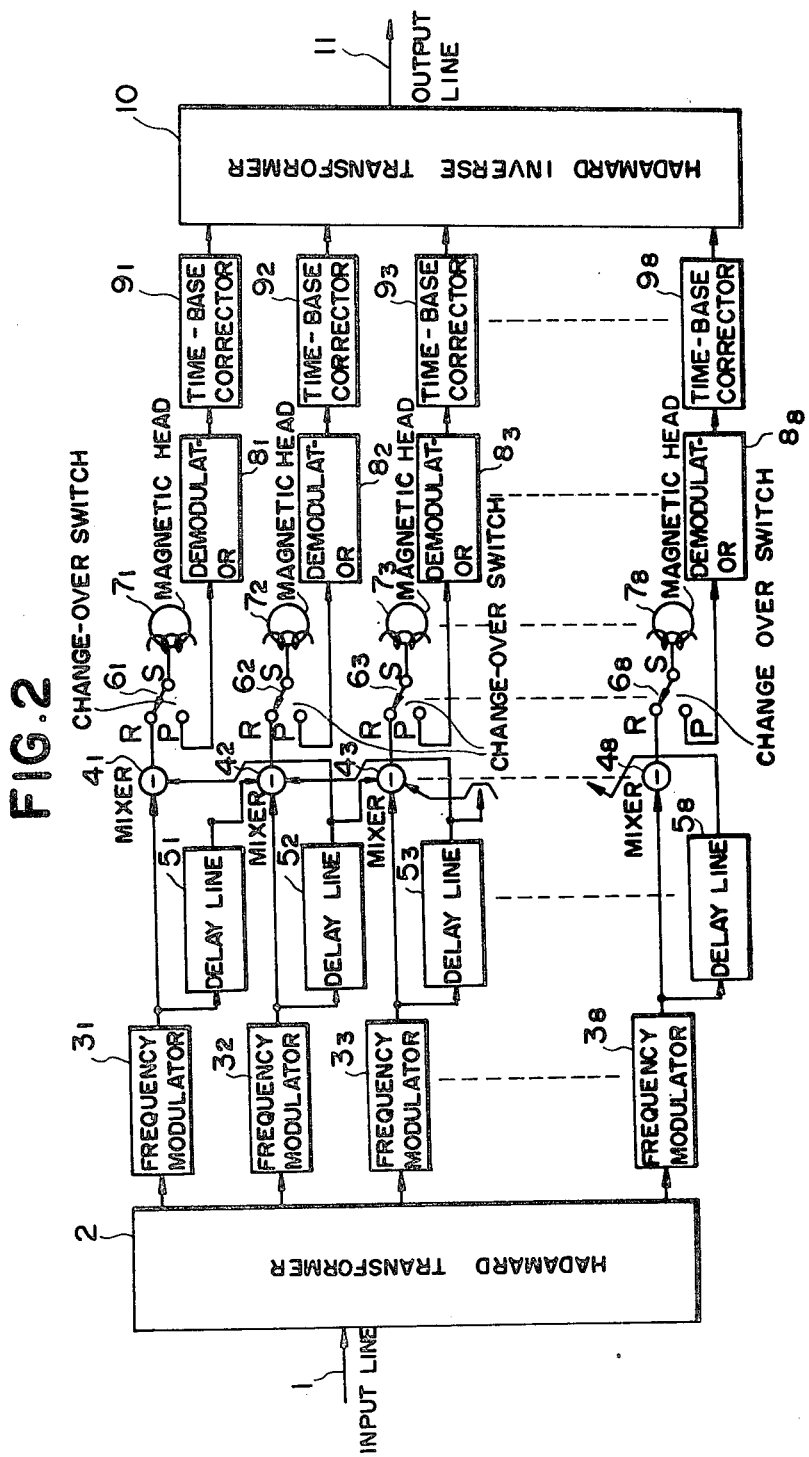

VIDEO TAPE RECORDING AND REPRODUCING APPARATUS

This is a continuation of application, Ser. No. 122,180 filed Feb. 19, 1980, now abandoned.

BACKGROUND OF THE INVENTION

1. Field of the Invention

The present invention relates to video-tape recording and reproducing apparatus, and more particularly to video-tape recording and reproducing apparatus which can record and reproduce, via a fixed multi-channel magnetic head, multi-channel transformer signals obtained from field signals by the use of the Hadamard Transformation System or the Time-Sharing System; and especially which can cancel out cross talk current caused by interference between heads during recording.

2. Description of Prior Art

Formerly, because of the special differential characteristics of recording and reproduction by magnetic heads used in this kind of video-tape recording and reproduction apparatus, the recording and reproduction of direct current components, which a transformer signal includes, has been difficult. Normally, the transformer signal is used to frequency modulate a charrier wave, so that the modulated carrier wave can be recorded and reproduced.

But if a multi-channel head is used as the magnetic head, interference occurs between the magnetic heads, caused by the close proximity of modulated carrier waves to each other, so that in addition to the recording current which passes through the head, an interference current (hereinafter called the cross talk current) is also present, and is recorded by the magnetic tape. If the cross talk current is recorded, on reproduction a beat type noise is produced by a combination of the recording current carrier wave frequency and the cross talk current carrier wave frequency.

FIG. 1 shows an FM modulated and demodulated frequency spectrum, and an explanation follows of the occurence of beat noise when cross talk current is reproduced. In FIG. 1, $J_0$, $+J_1$, $+J_2$, $-J_1$, $-J_2$, represents the FM modulated recorded current frequency spectrum, and $J_{c0}$, $+J_{c1}$, $+J_{c2}$, $-J_{c2}$, represents the cross talk current spectrum. Also, the hatched area represents the FM modulated passing zone on reproduction. Therefore, if the lower frequency bands ($-J_1$, $-J_2$, $-J_3$) drop into this zone, a beat disturbance will be created. Generally, the FM carrier wave frequency is chosen to be above that of the upper frequency limit of the above-mentioned passing zone. However, if a cross talk current exists, the difference in the carrier waves, i.e., in FIG. 1 among components such as $J_{c0}-J_0$, $J_{c1}-J_1$ and $J_{c2}-J_2$, creates lower frequency band components which drop into the demodulated passing zone, so it is very difficult to avoid beat noise. One method of eliminating such noise might be to make a large frequency differential between $J_0$ and $J_{c0}$ in order that the lower frequency band values of $J_{c0}-J_0$, $J_{c1}-J_1$, $J_{c2}-J_2$ become greater than the passing zone frequency and this is limited by the frequency band capacity of magnetic transformer parts.

SUMMARY OF THE INVENTION

An object of the present invention is to eliminate the above described disadvantages of the video-tape recording and reproducing apparatus.

Another object of the present invention is to provide video-tape recording and reproducing apparatus which can eliminate cross talk current caused by interference between heads during recording, and to obtain high quality reproduction.

According to the present invention, a video-tape recording and reproducing apparatus comprises: a system to transform the field signal into multi-channel signals; a number of modulators which produce modulated carrier waves, modulated by each of the above-mentioned transformer signals; a system to provide a fixed time delay of the above-mentioned modulated carrier waves, and also to mix the delayed carrier wave into the modulated carrier waves of neighbouring channels as a cancellation signal for cross talk current; and a multi-channel head for recording and reproducing the output of the mixing system.

The above-mentioned field signal is transformed into multi-channel signals by the Hadamard Transformation System or the Time-Sharing System. The above-mentioned modulators produce the FM modulated carrier waves, which are FM modulated by the transformer signals. The above-mentioned mixing system prossesses delay lines to provide modulated carrier waves with fixed time delays, and it also possesses mixers for mixing the delayed carrier waves into other modulated carrier wave channels.

BRIEF DESCRIPTION OF THE DRAWING

FIG. 2 is a block diagram which serves to illustrate an embodiment of the present invention.

DESCRIPTION OF THE PREFERRED EMBODIMENT

Figure 1:
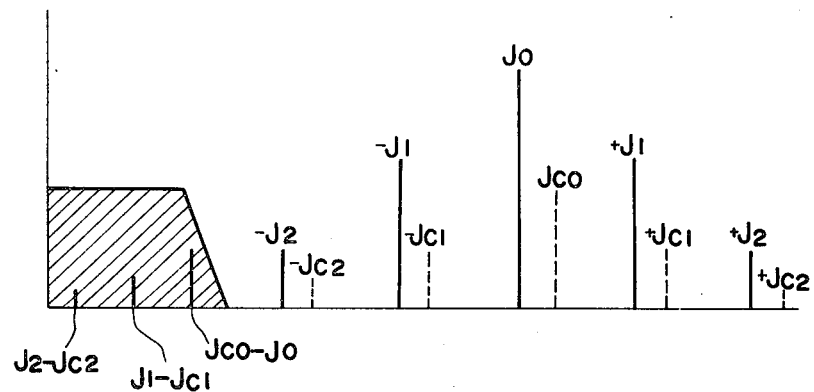
FIG. 1 is an explanatory drawing which serves to illustrate the occurrence of beat disturbance caused by cross talk current.

With reference to the drawing, one embodiment of the present invention will be explained.

In FIG. 2, reference numeral 1 represents the input line, through which the input field signal is supplied. To this line, 1, a transformer such as a Hadamard Transformer, 2, is connected; this transformer, 2, consists of a resistance matrix, etc., and provides Hadamard Transformer signals into a number of channels, in this case, the number being eight.

The outputs of transformer, 2, are connected to frequency modulators, $3_1$, $3_2$ ... $3_8$. These frequency modulators, $3_1$, $3_2$ ... $3_8$, by FM modulating the carrier wave using the above-mentioned Hadamard Transformer Signals, produce FM carrier wave outputs.

The output terminals of frequency modulators, $3_1$, $3_2$ ... $3_8$, are connected to one of the inputs of each mixer, $4_1$, $4_2$ ... $4_8$. The outputs of frequency modulators, $3_1$, $3_2$ ... $3_8$, are also supplied to delay lines, $5_1$, $5_2$ ... $5_8$, and the outputs of these delay lines, $5_1$, $5_2$ ... $5_8$, are connected to the other input of neighbouring channel mixer, 4, as shown in the diagram.

The arrangement serves to mix the delayed carrier wave into the modulated carrier waves of the neighbouring channels as a cancellation signal for cross talk current.

In this case, delay lines, $5_1$, $5_2$ ... $5_8$, are for delaying the modulated carrier wave by a fixed time.

The cross talk current which is caused by interference between the heads of the above-mentioned multichannel head possesses a time delay according to the distance between the heads and the heads' impedances.

Therefore, the delay time of the modulated carrier waves in the above-mentioned delay lines, $5_1, 5_2 \ldots 5_8$, is adjusted according to the delay time of the above-mentioned cross talk current, and this is when the delay carrier wave becomes the cancellation signal for the above-mentioned cross talk current.

The outputs of mixers, $4_1, 4_2 \ldots 4_8$, are connected to magnetic recording and reproducing heads, $7_1, 7_2 \ldots 7_8$, through the record contacts, R-S, of change-over switches, $6_1, 6_2 \ldots 6_8$.

Figure 3:
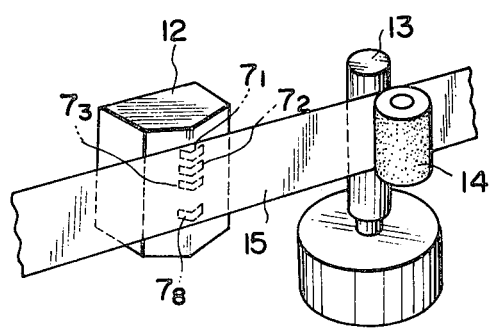
FIG. 3 is a schematic representation which serves to illustrate the multi-channel head used in the above-mentioned embodiment.

In this case, magnetic heads, $7_1, 7_2 \ldots 7_8$, are housed in a multi-channel head, as shown in FIG. 3, and the heads are positioned to align with magnetic tape, 15, which is driven by capstan, 13, and pinch roller, 14.

Magnetic heads, $7_1, 7_2 \ldots 7_8$, are connected to demodulators, $8_1, 8_2 \ldots 8_8$, through the reproduction contacts, P-S, of the above-mentioned change-over switches, $6_1, 6_2 \ldots 6_8$, and the output terminals of these demodulators, $8_1, 8_2 \ldots 8_8$, are connected to time-base correctors, $9_1, 9_2 \ldots 9_8$. These time-base correctors, $9_1, 9_2 \ldots 9_8$, are for correcting the jitter drift component present in the transformer signal itself and the time-base aberrations between each channel.

The output terminals of the time-base correctors, $9_1, 9_2 \ldots 9_8$, are connected to an inverse transformer, such as Hadamard Inverse Transformer, 10. Ths inverse transformer, 10, consists of a resistance matrix, etc., and from the output signals of the above-mentioned time-base correctors, $9_1, 9_2 \ldots 9_8$, the original filed signal is reproduced and fed into output line, 11.

The above-mentioned embodiment of the apparatus operates as follows.

Suppose that the apparatus is in the recording mode, with the record contacts of the change-over switches, $6_1, 6_2 \ldots 6_8$, being closed.

In this condition, if the field signal is supplied through input line, 1, the eight channels carrying the Hadamard Transformer signals will be supplied by Hadamard Transformer, 2, and these signals will be supplied to frequency modulators, $3_1, 3_2 \ldots 3_8$.

Then, the FM modulated carrier waves, which are frequency modulated by the transformer signals of each channel, are supplied to one input of each mixer, $4_1, 4_2 \ldots 4_8$.

Also, the modulated carrier waves from the above-mentioned frequency modulators, $3_1, 3_2 \ldots 3_8$, which, having passed through delay lines, $5_1, 5_2 \ldots 5_8$, have a fixed time delay, are supplied to the other input of the neighbouring channel's mixer, 4.

By this means, to the regular modulated carrier wave is mixed the other channel's fixed time delayed modulated carrier wave, and this mix is then supplied to the appropriate magnetic head, $7_1, 7_2 \ldots 7_8$, through the record contacts, R-S, of change-over switches, $6_1, 6_2 \ldots 6_8$.

In this case, although cross talk current arises, caused by the interference of the carrier waves between the heads during recording using the above-mentioned magnetic heads, $7_1, 7_2 \ldots 7_8$, the cross talk current is cancelled out by the presence of the other channel's fixed time delayed modulated carrier wave provided by delay lines, $5_1, 5_2 \ldots 5_8$. By this means, only the regular modulated carrier wave is recorded on the above-mentioned magnetic tape, through magnetic heads, $7_1, 7_2 \ldots 7_8$.

After this, closing the reproduction contacts, P-S, of the change-over switches, $6_1, 6_2 \ldots 6_8$, puts the apparatus into the reproducing mode.

Then, the reproduced carrier waves from the magnetic heads, $7_1, 7_2 \ldots 7_8$, are supplied to demodulators, $8_1, 8_2 \ldots 8_8$, through the reproduction contacts P-S, of change-over switches, $6_1, 6_2 \ldots 6_8$, and at this point, after demodulation, they are supplied to time-base correctors, $9_1, 9_2 \ldots 9_8$, where the jitter drift component, present in the transformer signal itself and the time-base aberrations between each channel, is negated. The outputs from the time-base correctors, $9_1, 9_2 \ldots 9_8$, are supplied to the Hadamard Inverse Transformer, 10, and the original field signal is then reproduced as the reproduction field signal and supplied to output line, 11.

Therefore, according to the above described embodiment, the elimination of cross talk current during recording by a multi-channel head can be achieved, and also beat noise caused by such cross talk current can be eliminated. By these means, high quality reproduction field signals can be obtained. Also, as cross talk current is eliminated by electrical means, mechanical cross talk countermeasures (for example, shields) are not required for the head itself, therefore contributing to cost reduction.

In addition, the present invention is not limited to the above embodiment but can be modified within the scope of the claims. For, example, in the above-mentioned embodiment eight channels are employed, but the present invention can be applied where a different number of channels is used. Also, in the above-mentioned embodiment, a Hadamard Transformation System is employed, but alternatively a Time-Sharing System can be used.

What is claimed is:

1. A video-tape recording and reproducing apparatus comprising:
    a system to transform a field signal into a multi-channel signal;
    a plurality of modulators to produce modulated carrier waves, modulated by each of the multi-channel signals;
    a system to provide a fixed time delay of the modulated carrier waves, and also to mix the delayed carrier wave into the modulated carrier waves of neighbouring channels as a cancellation signal for cross talk current; and a multi-channel head for recording and reproducing the output of the mixing system, the mixing system including a plurality of delay lines to delay the modulated carrier waves, and mixers to mix the delayed carrier waves with other channels' modulated carrier waves.

2. A video-tape recording and reproducing apparatus as set forth in claim 1, wherein a Hadamard transformer system is used as the transformer system to transform the field signal into multi-channel signals.

3. A video-tape recording and reproducing apparatus as set forth in claim 1, wherein a time sharing system is used as the transformer system to transform the field signal into multi-channel signals.

4. A video-tape recording and reproducing apparatus as set forth in claim 1, wherein FM modulators are used as the modulators to produce FM modulated carrier waves frequency modulated by the transformer signals.

* * * * *